United States Patent
Jojima (10) Patent No.: US 10,040,356 B2
(45) Date of Patent: Aug. 7, 2018

(54) POWER SUPPLY DEVICE (71) Applicant: Toyota Jidosha Kabushiki Kaisha, Toyota-shi, Aichi-ken (JP)

(72) Inventor: Yuki Jojima, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 4 days.

(21) Appl. No.: 15/427,577

(22) Filed: Feb. 8, 2017

(65) Prior Publication Data

US 2017/0225571 A1 Aug. 10, 2017

(30) Foreign Application Priority Data

Feb. 10, 2016 (JP) .................. 2016-023533

(51) Int. Cl.
*H02P 27/06* (2006.01)
*B60L 3/00* (2006.01)
*B60L 15/00* (2006.01)
*H02J 7/00* (2006.01)
*H02M 3/158* (2006.01)
*B60L 11/18* (2006.01)

(52) U.S. Cl.
CPC ............. *B60L 3/0046* (2013.01); *B60L 3/003* (2013.01); *B60L 11/1803* (2013.01); *B60L 11/1872* (2013.01); *B60L 15/007* (2013.01); *H02J 7/0065* (2013.01); *H02M 3/158* (2013.01); *H02P 27/06* (2013.01); *B60L 2210/14* (2013.01); *B60L 2240/52* (2013.01); *B60L 2240/525* (2013.01); *B60L 2240/527* (2013.01); *B60L 2240/529* (2013.01); *B60L 2240/545* (2013.01); *B60L 2240/547* (2013.01); *B60L 2240/549* (2013.01); *H02J 2007/0067* (2013.01); *Y02T 10/645* (2013.01); *Y02T 10/7005* (2013.01); *Y02T 10/705* (2013.01); *Y02T 10/7225* (2013.01)

(58) Field of Classification Search
CPC ....................................................... H02P 27/06
USPC ..................................................... 318/139, 34
See application file for complete search history.

(56) References Cited

U.S. PATENT DOCUMENTS

| 8,729,957 | B2 * | 5/2014 | Deam | ............... | H02M 1/08 307/43 |
| 2012/0229061 | A1 | 9/2012 | Itoh et al. | | |
| 2017/0166069 | A1 | 6/2017 | Jojima | | |

FOREIGN PATENT DOCUMENTS

| JP | 2012-210138 A | 10/2012 |
| JP | 2017-112664 A | 6/2017 |

\* cited by examiner

*Primary Examiner* — David S Luo
(74) *Attorney, Agent, or Firm* — Dinsmore & Shohl LLP (57) ABSTRACT

A power supply device includes first and second electric power lines, first and second boost converters, and an electronic control unit. The first and second electric power lines are connected to a load and a battery, respectively. The first and second boost converters each transfer electric power between the second and first electric power lines while changing a voltage of the electric power. The electronic control unit is configured to execute both-side driving when a temperature of the battery is equal to or more than a specified temperature and to execute one-side driving when the temperature is less than the specified temperature. The electronic control unit is configured to drive switching elements of the first and second boost converters with driving signals different in phase to execute the both-side driving, and to drive one of the first and second boost converters to execute the one-side driving.

7 Claims, 9 Drawing Sheets

POWER SUPPLY DEVICE

CROSS-REFERENCE TO RELATED APPLICATIONS

This application claims priority to Japanese Patent Application No. 2016-023533 filed on Feb. 10, 2016, the entire contents of which are hereby incorporated by reference.

BACKGROUND

1. Technical Field

The present disclosure relates to power supply devices, and more particularly relates to a power supply device including a battery and two boost converters.

2. Description of Related Art

As a power supply device of this type, there has conventionally been proposed a device including a battery, a first boost converter, and a second boost converter. The device is configured to control the first boost converter and the second boost converter such that electric power is supplied to each of a reactor of the first boost converter and a reactor of the second boost converter with phases shifted from each other (see, for example, Japanese Patent Application Publication No. 2012-210138). Here, the first boost converter and the second boost converter are connected to a first electric power line and a second electric power line in parallel to each other, the first electric power line being connected to a motor, the second electric power line being connected to a battery. The first boost converter and the second boost converter, each of which has a switching element, a diode and a reactor, transfer electric power between the second electric power line and the first electric power line, while changing a voltage of the electric power. The power supply device performs the aforementioned control to decrease a ripple of the electric power output to the second electric power line.

SUMMARY

In the aforementioned power supply device, a ripple of input and output current to and from the battery is considered to be decreased by performing the aforementioned control. Therefore, if the control is performed when the temperature of the battery is less than a specified temperature, the battery may have a gradual temperature increase, which may cause the time taken for temperature increase in the battery (time until the temperature of the battery becomes the specified temperature or more) to be relatively long.

The present disclosure provides a power supply device that prevents the time taken for temperature increase in the battery from being lengthened.

A power supply device according to a first aspect of the present disclosure includes a first electric power line, a second electric power line, a first boost converter, a second boost converter, and an electronic control unit. The first electric power line is connected to a load. The second electric power line is connected to a battery. The first boost converter includes a first switching element, a first diode, and a first reactor. The first boost converter is connected to the first electric power line and the second electric power line. The first boost converter transfers electric power between the second electric power line and the first electric power line while changing a voltage of the electric power. The second boost converter includes a second switching element, a second diode, and a second reactor. The second boost converter is connected to the first electric power line and the second electric power line. The second boost converter transfers electric power between the second electric power line and the first electric power line while changing the voltage of the electric power. The electronic control unit is configured to execute both-side driving when a temperature of the battery is equal to or more than a specified temperature and to execute one-side driving when the temperature of the battery is less than the specified temperature. The electronic control unit is configured to drive the first switching element of the first boost converter and the second switching element of the second boost converter with driving signals different in phase to execute the both-side driving. The electronic control unit is configured to drive one of the first boost converter and the second boost converter to execute the one-side driving. The load may be a motor.

The power supply device according to the first aspect executes both-side driving to drive the first switching element of the first boost converter and the second switching element of the second boost converter with driving signals different in phase when the temperature of the battery is equal to or more than a specified temperature. Accordingly, it becomes possible to decrease a ripple of input-output current of the battery. Meanwhile, when the temperature of the battery is less than the specified temperature, one-side driving is executed to drive only one of the first and second boost converters. Accordingly, as compared with the case of executing the both-side driving, the ripple of the input-output current of the battery can be increased, which makes it possible to promote temperature increase in the battery. As a result, it becomes possible to prevent the time taken for temperature increase in the battery (time until the temperature of the battery becomes the specified temperature or more) from becoming relatively long.

In the power supply device according to the aspect, the electronic control unit may be configured to execute the both-side driving when the temperature of the battery is less than the specified temperature and an absolute value of a target output of the load is equal to or more than a predetermined output. The power supply device according to the aspect can avoid transfer of relatively large electric power between the second electric power line and the first electric power line only through one of the first and second boost converters.

In the power supply device according to the aspect, the electronic control unit may be configured to execute the one-side driving when the temperature of the battery is equal to or more than the specified temperature and the absolute value of the target output of the load is less than a second predetermined output that is smaller than the predetermined output. In the power supply device according to the aspect, total efficiency of the first and second boost converters can be enhanced by appropriately setting the second predetermined output in consideration of the total efficiency of the first and second boost converters in the both-side driving and the one-side driving.

In the power supply device according to the aspect, the electronic control unit may be configured to, to execute the one-side driving, drive only the first boost converter at first, and then drive only the second boost converter after the temperature of the first boost converter becomes a second specified temperature or more. The power supply device according to the aspect can suppress excessive temperature increase in respective elements of the first boost converter, while continuing the one-side driving over a longer time.

A power supply device according to a second aspect of the present disclosure includes a first electric power line, a second electric power line, a first boost converter, a second boost converter, and an electronic control unit. The first electric power line is connected to a load. The second electric power line is connected to a battery. The first boost converter includes a first switching element, a first diode, and a first reactor. The first boost converter is connected to the first electric power line and the second electric power line. The first boost converter transfers electric power between the second electric power line and the first electric power line while changing a voltage of the electric power. The second boost converter includes a second switching element, a second diode, and a second reactor. The second boost converter is connected to the first electric power line and the second electric power line. The second boost converter transfers electric power between the second electric power line and the first electric power line while changing the voltage of the electric power. The electronic control unit is configured to execute both-side driving when an absolute value of a target output of the load is equal to or more than a threshold and to execute one-side driving when the absolute value of the target output of the load is less than the threshold. The electronic control unit is configured to drive the first switching element of the first boost converter and the second switching element of the second boost converter with driving signals different in phase to execute the both-side driving. The electronic control unit is configured to drive one of the first boost converter and the second boost converter to execute the one-side driving. The threshold at a first time when a temperature of the battery is less than a specified temperature is larger than the threshold at a second time when the temperature of the battery is equal to or more than the specified temperature. The load may be a motor The power supply device according to the second aspect executes both-side driving to drive the first switching element of the first boost converter and the second switching element of the second boost converter with driving signals different in phase when the absolute value of the target output of the motor is equal to or more than a threshold, and executes one-side driving to drive only one of the first and second boost converters when the absolute value of the target output of the motor is less than the threshold. The threshold at the first time when the temperature of the battery is less than the specified temperature is set to be larger than the threshold at the second time when the temperature of the battery is equal to or more than the specified temperature. That is, when the temperature of the battery is less than the specified temperature, a range of the absolute value of the target output of the motor in which the one-side driving is executed is enlarged as compared with when the temperature of the battery is equal to or more than the specified temperature. When the one-side driving is executed, the ripple of the input-output current of the battery can be increased as compared with when the both-side driving is executed. Accordingly, by enlarging the range of the absolute value of the target output of the motor in which the one-side driving is executed, temperature increase in the battery can be promoted. As a result, it becomes possible to prevent the time taken for temperature increase in the battery (time until the temperature of the battery becomes the specified temperature or more) from becoming relatively long.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Now, the modes for carrying out the present disclosure will be described based on the embodiments.

Figure 1:
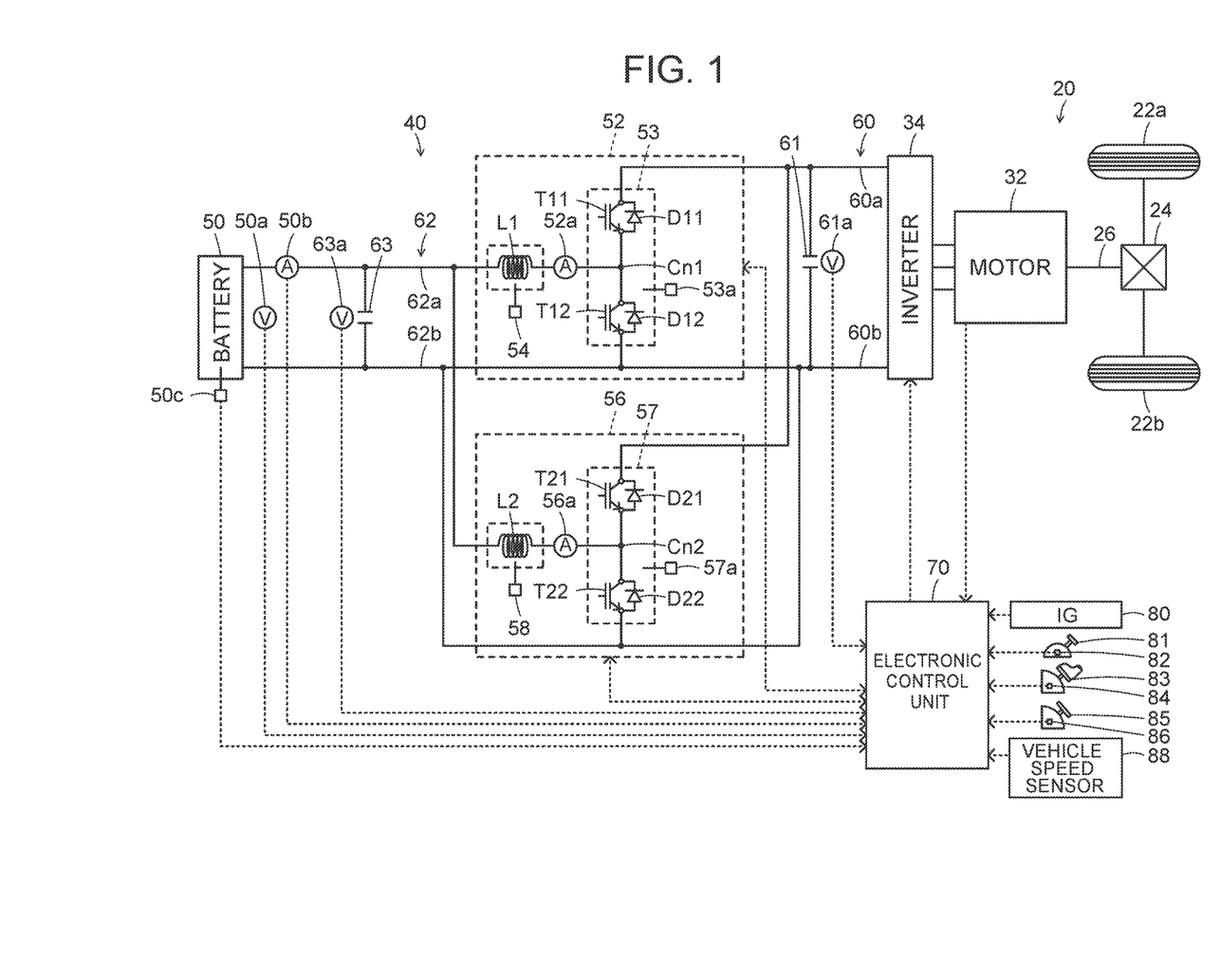
FIG. 1 is a block diagram illustrating an outlined configuration of an electric vehicle 20 incorporating a power supply device 40 as one embodiment of the present disclosure.

FIG. 1 is a block diagram illustrating an outlined configuration of an electric vehicle 20 incorporating a power supply device 40 as one embodiment of the present disclosure. As illustrated in FIG. 1, the electric vehicle 20 in the embodiment includes a motor 32, an inverter 34, a battery 50, first and second boost converters 52, 56, and an electronic control unit 70. Here, the power supply device 40 of the embodiment corresponds to the battery 50, the first and second boost converters 52, 56, and the electronic control unit 70.

The motor 32 is configured, for example, as a synchronous generator-motor, and a rotor of the motor 32 is connected to a driving shaft 26 coupled to driving wheels 22a, 22b through a differential gear 24. The inverter 34 is connected with the motor 32 and is also connected with the first and second boost converters 52, 56 through a high-voltage system electric power line 60 as the first electric power line. The motor 32 is rotationally driven when the electronic control unit 70 controls switching of a plurality of switching elements of the inverter 34, which are not illustrated.

The battery 50 is configured, for example, as a lithium-ion secondary battery or a nickel-hydrogen secondary battery. The battery 50 is connected with the first and second boost converters 52, 56 through a low-voltage system electric power line 62 as the second electric power line.

The first boost converter 52 is connected to the high-voltage system electric power line 60 and the low-voltage system electric power line 62. The first boost converter 52 has two transistors T11, T12 as switching elements, two diodes D11, D12, and a reactor L1. The transistor T11 is connected to a positive electrode line 60a of the high-voltage system electric power line 60. The transistor T12 is connected to the transistor T11, a negative electrode line 60b of the high-voltage system electric power line 60, and a negative electrode line 62b of the low-voltage system electric power line 62. The two diodes D11, D12 are connected in parallel to the transistors T11, T12 in an opposite direction, respectively. The reactor L1 is connected to a center point Cn1 between the transistor T11 and the transistor T12 and to a positive electrode line 62a of the low-voltage system electric power line 62. A ratio of turn-on time of the transistors T11, T12 is regulated by the electronic control unit 70. Accordingly, the first boost converter 52 supplies electric power of the low-voltage system electric power line 62 to the high-voltage system electric power line 60 while boosting a voltage of the electric power, and supplies electric power of the high-voltage system electric power line 60 to the low-voltage system electric power line 62 while lowering the voltage of the electric power. Hereinafter, a portion corresponding to the transistors T11, T12 and the diodes D11, D12 in the first boost converter 52 is referred to as a switch unit 53.

The second boost converter 56 is connected to the high-voltage system electric power line 60 and the low-voltage system electric power line 62 in parallel with the first boost converter 52. The second boost converter 56 has two transistors T21, T22 as switching elements, two diodes D21, D22, and a reactor L2 as in the case of the first boost converter 52. The transistor T21 is connected to the positive electrode line 60a of the high-voltage system electric power line 60. The transistor T22 is connected to the transistor T21, the negative electrode line 60b of the high-voltage system electric power line 60, and the negative electrode line 62b of the low-voltage system electric power line 62. The two diodes D21, D22 are connected in parallel to the transistors T21, T22 in the opposite direction, respectively. The reactor L2 is connected to a center point Cn2 between the transistor T21 and the transistor T22 and to the positive electrode line 62a of the low-voltage system electric power line 62. A ratio of turn-on time of the transistors T21, T22 is regulated by the electronic control unit 70. Accordingly, the second boost converter 56 supplies the electric power of the low-voltage system electric power line 62 to the high-voltage system electric power line 60 while boosting the voltage of the electric power, and supplies the electric power of the high-voltage system electric power line 60 to the low-voltage system electric power line 62 while lowering the voltage of the electric power. Hereinafter, a portion corresponding to the transistors T21, T22 and the diodes D21, D22 in the second boost converter 56 is referred to as a switch unit 57.

The positive electrode line 60a and the negative electrode line 60b of the high-voltage system electric power line 60 are equipped with a smoothing capacitor 61. The positive electrode line 62a and the negative electrode line 62b of the low-voltage system electric power line 62 are equipped with a smoothing capacitor 63.

Although not illustrated, the electronic control unit 70 is configured as a microprocessor having a CPU as a main component. The electronic control unit 70 includes a ROM that stores processing programs, a RAM that temporarily stores data, and input and output ports in addition to the CPU.

The electronic control unit 70 receives signals from various sensors through the input port. The signals input into the electronic control unit 70 include: a rotational position $\theta m$ from a rotational position detection sensor that detects a rotational position of a rotor of the motor 32; a phase current from a current sensor that detects a current that passes each phase of the motor 32; a voltage Vb of the battery 50 from a voltage sensor 50a installed between terminals of the battery 50; a current Ib of the battery 50 from a current sensor 50b attached to the output terminal of the battery 50; a temperature Tb of the battery 50 from a temperature sensor 50c attached to the battery 50; a voltage VH of the capacitor 61 (high-voltage system electric power line 60) from a voltage sensor 61a attached between terminals of the capacitor 61; a voltage VL of the capacitor 63 (low-voltage system electric power line 62) from a voltage sensor 63a attached between terminals of the capacitor 63; a current IL1 of the reactor L1 from a current sensor 52a that detects a current flowing to the reactor L1 of the first boost converter 52; a temperature Ts1 of the switch unit 53 from a temperature sensor 53a attached to the switch unit 53 of the first boost converter 52; a temperature TL1 of the reactor L1 from a temperature sensor 54 attached in the vicinity of the reactor L1 of the first boost converter 52; a current IL2 of the reactor L2 from a current sensor 56a that detects a current flowing to the reactor L2 of the second boost converter 56; a temperature Ts2 of the switch unit 57 from a temperature sensor 57a attached to the switch unit 57 of the second boost converter 56; a temperature TL2 of the reactor L2 from a temperature sensor 58 attached in the vicinity of the reactor L2 of the second boost converter 56; an ignition signal from an ignition switch 80; a shift position SP from a shift position sensor 82 that detects an operative position of a shift lever 81; an accelerator opening Acc from an accelerator pedal position sensor 84 that detects a stepping-in amount of an accelerator pedal 83; a brake pedal position BP from a brake pedal position sensor 86 that detects a stepping-in amount of a brake pedal 85; and a vehicle speed V from a vehicle speed sensor 88.

The electronic control unit 70 outputs various control signals through the output port. The signals output from the electronic control unit 70 include: switching control signals to a plurality of switching elements of the inverter 34, the switching elements not illustrated; and switching control signals for the transistors T11, T12, T21, T22 of the first and second boost converters 52, 56.

The electronic control unit 70 calculates the number of rotations Nm of the motor 32 based on the rotational position $\theta m$ of the rotor of the motor 32 from the rotational position detection sensor. The electronic control unit 70 also calculates a state of charge (SOC) of the battery 50 based on an integrated value of the current Ib of the battery 50 from the current sensor 50b. Here, the state of charge SOC of the battery 50 refers to a ratio of capacity of electric power dischargeable from the battery 50 to the total capacity of the battery 50.

In the electric vehicle 20 in the embodiment configured in this way, the electronic control unit 70 first sets a request torque Tp* that is requested for traveling (requested for the driving shaft 26) based on the accelerator opening Acc and the vehicle speed V, and sets the set request torque Tp* as a torque command Tm* of the motor 32. Then, switching of the plurality of switching elements of the inverter 34 is controlled such that the motor 32 is driven with the torque command Tin*. Control of the first and second boost converters 52, 56 will be described below.

Figure 2:
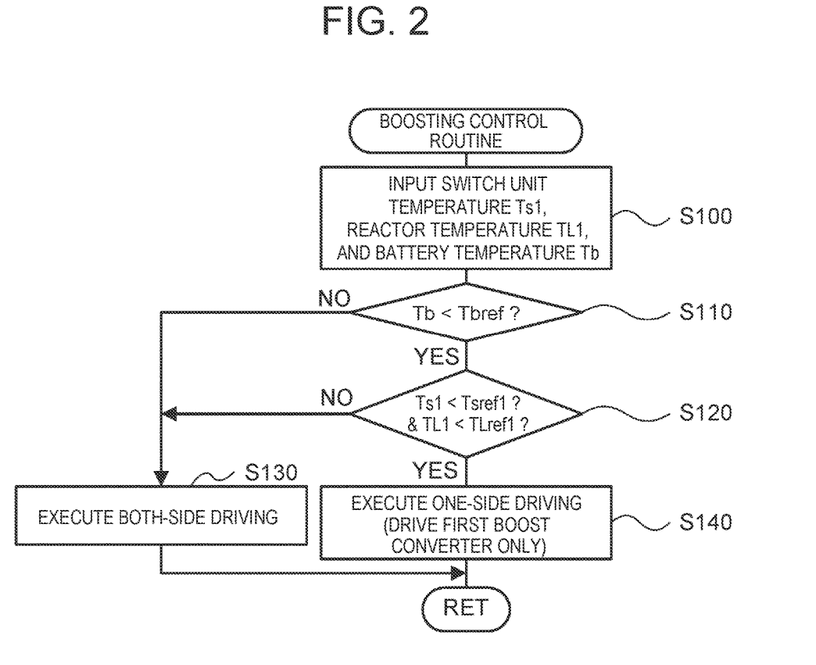
FIG. 2 is a flowchart illustrating one example of a boosting control routine executed by an electronic control unit 70 in the embodiment.

Now a description is given of the operation of the electric vehicle 20 in the thus-configured embodiment, and control of the first and second boost converters 52, 56 in particular. FIG. 2 is a flowchart illustrating one example of a boosting control routine executed by the electronic control unit 70 in the embodiment. The routine is repeatedly executed.

When the boosting control routine is executed, the electronic control unit 70 first inputs the temperature Ts1 of the switch unit 53 of the first boost converter 52, the temperature TL1 of the reactor L1 of the first boost converter 52, and the temperature Tb of the battery 50 (step S100). Here, the temperature Ts1 of the switch unit 53 to be input is a value detected by the temperature sensor 53a. The temperature TL1 of the reactor L1 to be input is a value detected by the temperature sensor 54. The temperature Tb of the battery 50 to be input is a value detected by the temperature sensor 50c.

Once the data is input, the input temperature Tb of the battery 50 is compared with a threshold Tbref (step S110). Here, the threshold Tbref is a threshold used to determine whether or not temperature increase in the battery 50 is requested. For example, temperatures such as 18° C., 20° C., and 22° C. may be used as the threshold.

When the temperature Tb of the battery 50 is equal to or more than the threshold Tbref, it is determined that the temperature increase in the battery 50 is not requested. Accordingly, both-side driving is executed to drive both the first and second boost converters 52, 56 (step S130), and the present routine is ended.

Figure 3:
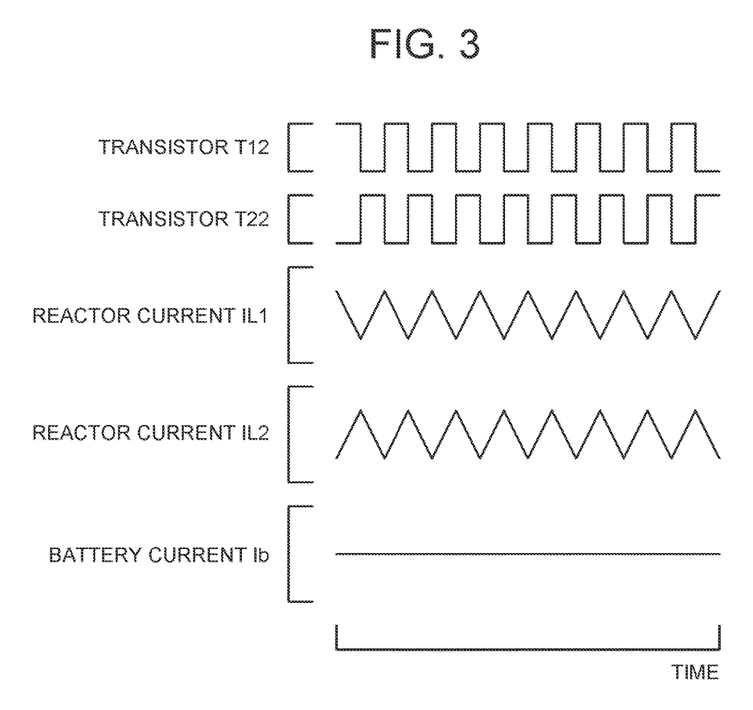
FIG. 3 is an explanatory view illustrating one example of relationship among turning on and off of the transistors T12, T22, currents IL1, IL2 of the reactors L1, L2, and a current Ib of a battery 50 when a driving signal of the transistor T12 of a first boost converter 52 is shifted 180 degrees (half cycle) in phase from a driving signal of the transistor T22 of a second boost converter 56 in both-side driving.

When the both-side driving is executed, the first and second boost converters 52, 56 are controlled as follows. First, a target voltage VH* of the high-voltage system electric power line 60 is set based on a target driving point of the motor 32 (torque command Tm*, the number of rotations Nm). Next, a target electric power Pm* of the motor 32 is computed as a product of the torque command Tm* and the number of rotations Nm of the motor 32. Then, a total target current IL* of the first and second boost converters 52, 56 is set based on the voltage VH and the target voltage VH* of the high-voltage system electric power line 60 and the target electric power Pm* of the motor 32. Then, the total target current IL* is multiplied by distribution ratios D1, D2 of the first and second boost converters 52, 56 (reactors L1, L2) to set target currents IL1*, IL2* of the reactors L1, L2. Here, the distribution ratios D1, D2 refer to ratios of the total target currents IL* that are transferred between the low-voltage system electric power line 62 and the high-voltage system electric power line 60 through the first and second boost converters 52, 56 (reactors L1, L2), respectively. The sum of the distribution ratio D1 and the distribution ratio D2 equals to a value one. The distribution ratio D1 can be set to 0.5, for example. Switching of the transistors T11 12, T21, T22 of the first and second boost converters 52, 56 is controlled such that the currents IL1, IL2 of the reactors L1, L2 of the first and second boost converters 52, 56 become the target currents IL1*, IL2*. In the embodiment, switching control of the transistors T11, T12, T21, T22 is performed by driving the transistor T11 (transistor T12) and the transistor T21 (transistor T22) with driving signals that are different in phase. Accordingly, as compared with the case of driving the transistor T11 (transistor T12) and the transistor T21 (transistor T22) with the driving signals identical in phase, a ripple component of the current IL1 of the reactor L1 is shifted in phase from a ripple component of the current IL2 of the reactor L2. As a result, the ripple of the current Ib of the battery 50 can be decreased. FIG. 3 illustrates one example of relationship among turning on and off of the transistors T12, T22, the currents IL1, IL2 of the reactors L1, L2, and the current Ib of the battery 50 when the driving signal of the transistor T12 of the first boost converter 52 is shifted 180 degrees (half cycle) in phase from the driving signal of the transistor T22 of the second boost converter 56 in the both-side driving. Thus, when the driving signal of the transistor T12 (transistor T11) is shifted 180 degrees (half cycle) in phase from the driving signal of the transistor T22 (transistor T21), the ripple of the current Ib of the battery 50 can be decreased more.

When the temperature Tb of the battery 50 is less than the threshold Tbref in step S110, it is determined that the temperature increase in the battery 50 is requested. Accordingly, the temperature Ts1 of the switch unit 53 is compared with the threshold Tsref1, and the temperature TL1 of the reactor L1 is compared with the threshold TLref1 (step S120). Here, the threshold Tsref1 is a threshold used to determine whether or not the temperature Ts1 of the switch unit 53 is relatively high. For example, temperatures such as 100° C., 110° C., and 120° C. may be used based on parameters such as rated values of the transistors T11, T12 and the diodes D11, D12 of the switch unit 53. The threshold TLref1 is a threshold used to determine whether or not the temperature TL1 of the reactor L1 is relatively high. For example, temperatures such as 140° C., 150° C., and 160° C. may be used based on parameters such as the rated value of the reactor L1.

When the temperature Ts1 of the switch unit 53 is less than the threshold Tsref1 and the temperature TL1 of the reactor L1 is less than the threshold TLref1 in step S120, the one-side driving is executed to drive only one of the first and second boost converters 52, 56 (step S140), and the present routine is ended.

In the embodiment, when the one-side driving is executed, only the first boost converter 52 is driven. In this case, the first boost converter 52 is controlled as below. First, the target voltage VH* of the high-voltage system electric power line 60, the target electric power Pm* of the motor 32, and the total target current IL* of the first and second boost converters 52, 56 are set as in the case of executing the both-side driving. Then, switching control of the transistors T11, T12 of the first boost converter 52 is performed such that the current IL of the reactor L1 of the first boost converter 52 becomes the total target current IL*. In this case, as compared with the case of executing the both-side driving, the ripple of the current Ib of the battery 50 is increased, which makes it possible to promote temperature increase in the battery 50. As a result, it becomes possible to prevent the time taken for temperature increase in the battery 50 (time until the temperature Tb of the battery 50 becomes the threshold Tbref or more) from becoming relatively long.

When the temperature Ts1 of the switch unit 53 is equal to or more than the threshold Tsref1 or when the temperature TL1 of the reactor L1 is equal to or more than the threshold TLref1 in step S120, the both-side driving is executed (step S130) and the present routine is ended. When only the first boost converter 52 is driven as the one-side driving, a current with a large absolute value flows into each element of the first boost converter 52 as compared with the case of executing the both-side driving. As a result, the temperature of each element of the first boost converter 52 tends to increase. In the embodiment, even when the temperature Tb of the battery 50 is less than the threshold Tbref, excessive temperature increase in each element of the first boost converter 52 can still be suppressed by executing the both-side driving if the temperature Ts1 of the switch unit 53 is equal to or more than the threshold Tsref1 or the temperature TL1 of the reactor L1 is equal to or more than the threshold TLref1.

Figure 4:
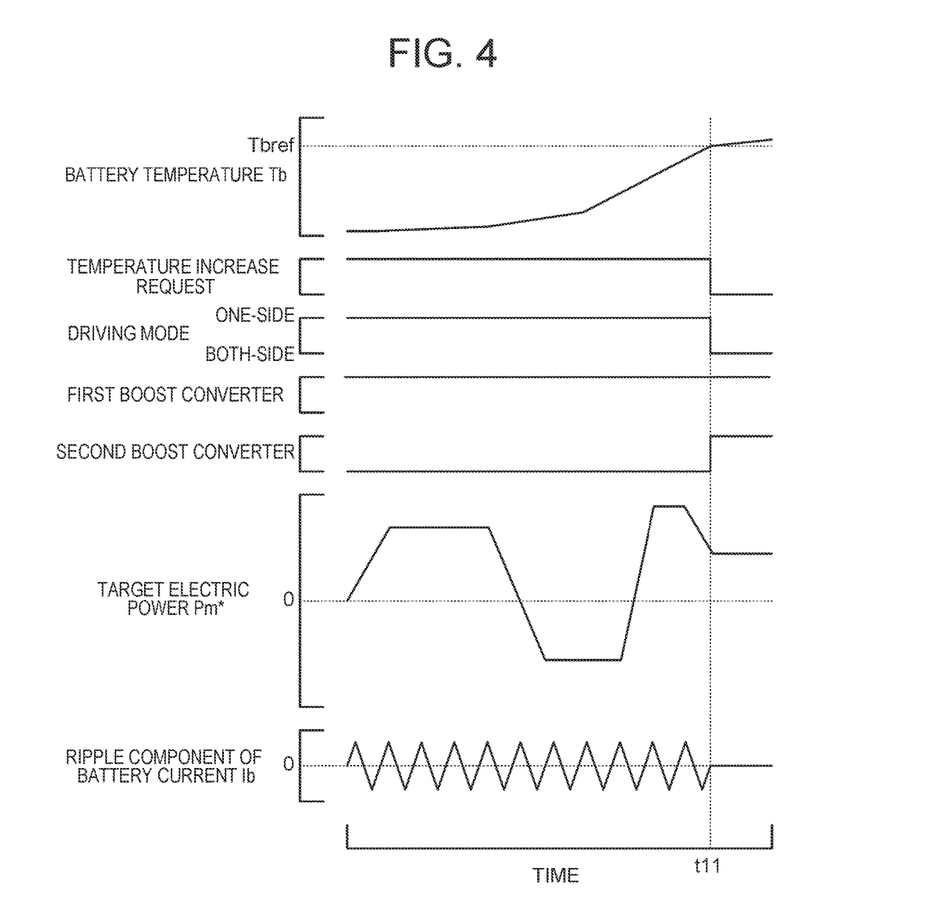
FIG. 4 is an explanatory view illustrating one example of temporal change in a temperature Tb and a temperature increase request of the battery 50, a driving mode (one-side driving, both-side driving) and presence of driving of the first and second boost converters 52, 56, a target electric power Pm* of the motor 32, and a ripple component of the current Ib of the battery 50.

FIG. 4 is an explanatory view illustrating one example of temporal change in the temperature Tb and the temperature increase request of the battery 50, the driving mode (one-side driving, both-side driving) and presence of driving of the first and second boost converters 52, 56, the target electric power Pm* of the motor 32, and the ripple component of the current Ib of the battery 50. As illustrated in the drawing, when the temperature Tb of the battery 50 is less than the threshold Tbref, temperature increase in the battery 50 is requested, and only the first boost converter 52 is driven as the one-side driving. Accordingly, as compared with the case of executing the both-side driving, the ripple of the current Ib of the battery 50 can be increased to promote temperature increase in the battery 50. When the temperature Tb of the battery 50 becomes equal to or more than the threshold Tbref at time t11, the request for temperature increase in the battery 50 is ended and the one-side driving is switched to the both-side driving. As a result, it becomes possible to decrease the ripple of the current Ib of the battery 50.

In the power supply device 40 incorporated in the electric vehicle 20 in the embodiment described in the foregoing, when the temperature Tb of the battery 50 is equal to or more than the threshold Tbref, the both-side driving is executed to drive the transistor T11 (transistor T12) of the first boost converter 52 and the transistor T21 (transistor T22) of the second boost converter 56 with the driving signals different in phase. As a result, it becomes possible to decrease the ripple of the current Ib of the battery 50. When the temperature Tb of the battery 50 is less than the threshold Tbref, the one-side driving is basically executed to drive only the first boost converter 52 (on condition that the temperature Ts1 of the switch unit 53 is less than the threshold Tsref1 and the temperature TL1 of the reactor L1 is less than the threshold TLref1). Accordingly, as compared with the case of executing the both-side driving, the ripple of the current Ib of the battery 50 can be increased to promote temperature increase in the battery 50. As a result, it becomes possible to prevent the time taken for temperature increase in the battery 50 (time until the temperature Tb of the battery 50 becomes the threshold Tbref or more) from becoming relatively long.

In the power supply device 40 incorporated in the electric vehicle 20 in the embodiment, when the temperature Tb of the battery 50 is less than the threshold Tbref, the one-side driving is executed if the temperature Ts1 of the switch unit 53 is less than the threshold Tsref1 and the temperature TL1 of the reactor L1 is less than the threshold TLref1, whereas the both-side driving is executed if the temperature Ts1 of the switch unit 53 is equal to or more than the threshold Tsref1 or the temperature TL1 of the reactor L1 is equal to or more than the threshold TLref1. However, when the temperature Tb of the battery 50 is less than the threshold Tbref, the one-side driving may be executed irrespective of the temperature Ts1 of the switch unit 53 or the temperature TL1 of the reactor L1.

Figure 5:
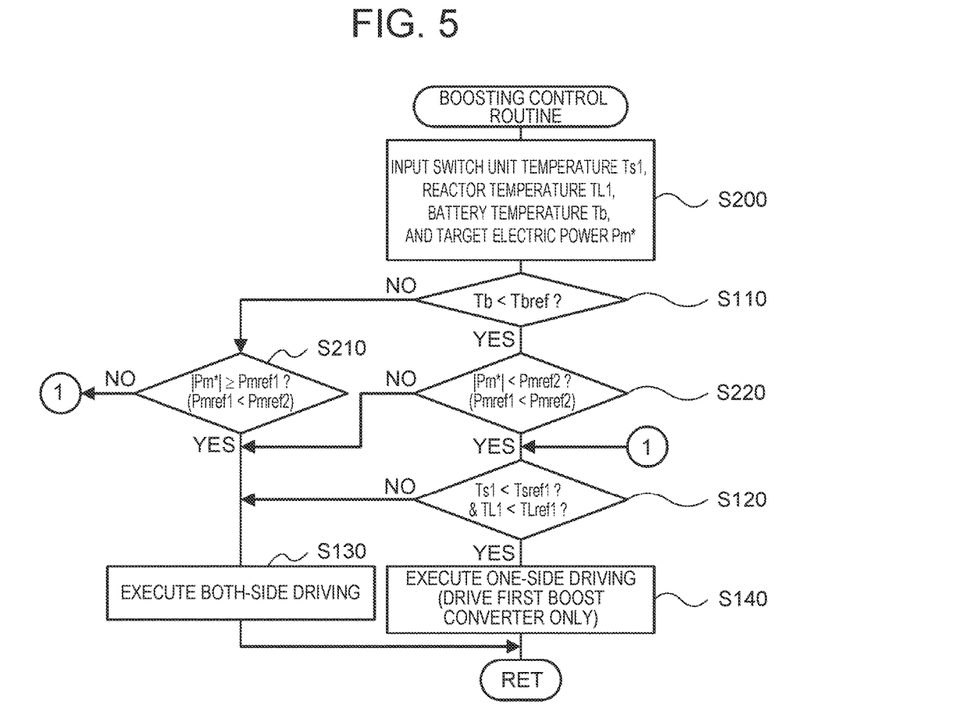
FIG. 5 is a flowchart illustrating one example of a boosting control routine.

In the power supply device 40 incorporated in the electric vehicle 20 in the embodiment, the electronic control unit 70 executes the boosting control routine of FIG. 2. However, the electronic control unit 70 may execute a boosting control routine of FIG. 5. Here, the boosting control routine of FIG. 5 is identical to the boosting control routine of FIG. 2 except for the point that the processing of step S100 is replaced with processing of step S200 and the point that processing of steps S210, S220 is added. Therefore, like processing is designated by like step number, and a detailed description thereof is omitted.

When the boosting control routine of FIG. 5 is executed, the electronic control unit 70 first inputs the temperature Ts1 of the switch unit 53, the temperature TL1 of the reactor L1, and the temperature Tb of the battery 50 as in the processing of step S100 in the boosting control routine of FIG. 2. In addition, the electronic control unit 70 inputs the target electric power Pm* of the motor 32 (step S200). Here, the target electric power Pm* of the motor 32 to be input is a value calculated as a product of a torque command Tm* and the number of rotations Nm of the motor 32.

Once the data is input, the input temperature Tb of the battery 50 is compared with the threshold Tbref (step S110). When the temperature Tb of the battery 50 is equal to or more than the threshold Tbref, it is determined that the temperature increase in the battery 50 is not requested, and an absolute value of the target electric power Pm* of the motor 32 is compared with a threshold Pmref1 (step S210). Here, the threshold Pmref1 is a lower limit of the range of the absolute value of the target electric power Pm* of the motor 32 in which the total efficiency of the first and second boost converters 52, 56 in a both-side driving mode is better than the total efficiency of the first and second boost converters 52, 56 in a one-side driving mode.

When the absolute value of the target electric power Pm* of the motor 32 is equal to or more than the threshold Pmref1 in step S210, the both-side driving is executed (step S130) and the present routine is ended. On the contrary, when the absolute value of the target electric power Pm* of the motor 32 is less than the threshold Pmref1, processing subsequent to step S120 is executed. In this case, the one-side driving is executed on condition that the temperature Ts1 of the switch unit 53 is less than the threshold Tsref and the temperature TL1 of the reactor L1 is less than the threshold TLref1. Thus, the one-side driving or the both-side driving is executed in accordance with size relation between the absolute value and the threshold Pmref1 of the target electric power Pm* of the motor 32 so as to enhance the total efficiency of the first and second boost converters 52, 56.

When the temperature Tb of the battery 50 is less than the threshold Tbref in step S110, it is determined that the temperature increase of the battery 50 is requested. Accordingly, the absolute value of the target electric power Pm* of the motor 32 is compared with a threshold Pmref2 that is larger than the threshold Pmref1 (step S220). Here, the threshold Pmref2 is a threshold used to determine whether or not the absolute value of the current IL1 of the reactor L1 becomes relatively large when only the first boost converter 52 is driven as the one-side driving.

When the absolute value of the target electric power Pm* of the motor 32 is less than the threshold Pmref2 in step 5220, processing subsequent to step S120 is executed. In this case, the one-side driving is executed on condition that the temperature Ts1 of the switch unit 53 is less than the threshold Tsref1 and the temperature TL1 of the reactor L1 is less than the threshold TLref1. As a result, the temperature increase in the battery 50 can be promoted as in the case of the embodiment.

When the absolute value of the target electric power Pm* of the motor 32 is equal to or more than the threshold Pmref2 in step S220, the both-side driving is executed (step S130) and the present routine is ended. As a consequence, it becomes possible to prevent the absolute value of the current IL1 of the reactor L1 from becoming relatively large, i.e., to prevent relatively large electric power from being transferred between the low-voltage system electric power line 62 and the high-voltage system electric power line 60 only through the first boost converter 52.

Figure 6:
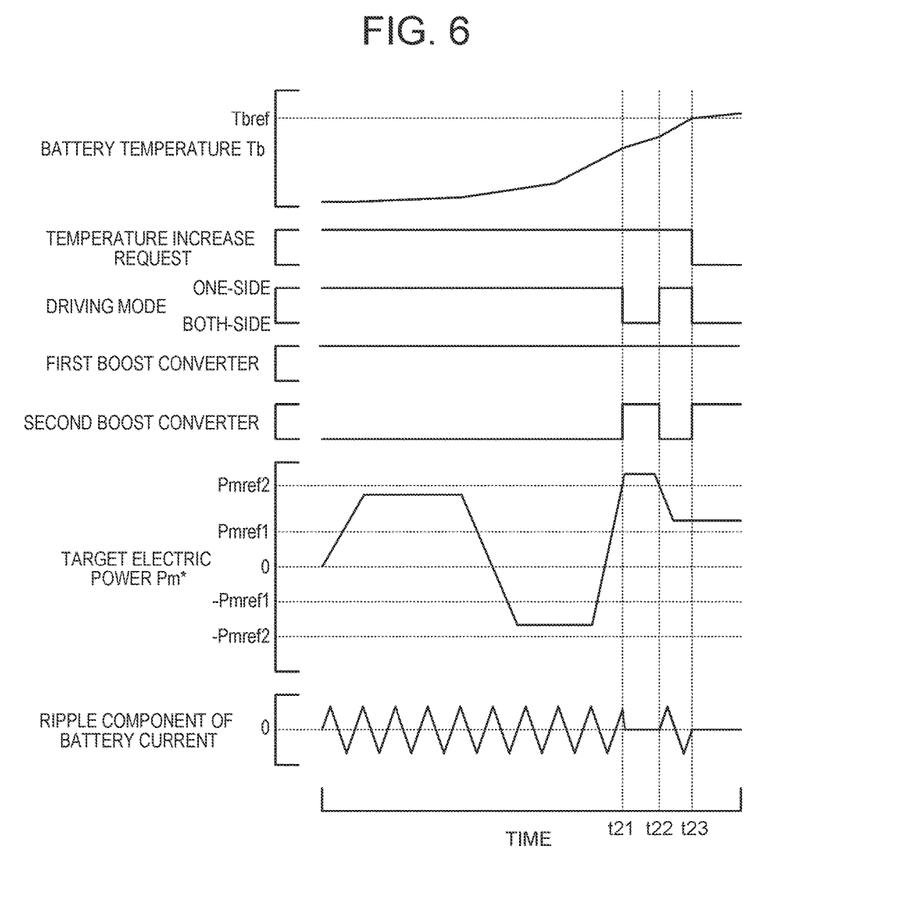
FIG. 6 is an explanatory view illustrating one example of temporal change in the temperature Tb and the temperature increase request of the battery 50, the driving mode (one-side driving, both-side driving) and the presence of driving of the first and second boost converters 52, 56, the target electric power Pm* of the motor 32, and the ripple component of the current Ib of the battery 50.

FIG. 6 is an explanatory view illustrating one example of temporal change in the temperature Tb and the temperature increase request of the battery 50, the driving mode (one-side driving, both-side driving) and the presence of driving of the first and second boost converters 52, 56, the target electric power Pm* of the motor 32, and the ripple component of the current Ib of the battery 50 in the present modification. In FIG. 6, the state before time t21 is the same as the state in FIG. 4. When the absolute value of the target electric power Pm* of the motor 32 becomes equal to or more than the threshold Pmref2 at time t21, the one-side driving is switched to the both-side driving. This makes it possible to prevent the absolute value of the current IL1 of the reactor L1 from becoming relatively large. In this case, since the ripple of the current Ib of the battery 50 decreases, it is considered that the temperature increase in the battery 50 becomes slightly gradual. Then, when the absolute value of the target electric power Pm* of the motor 32 becomes less than the threshold Pmref2 at time t22, the both-side driving is switched to the one-side driving. Then, when the temperature Tb of the battery 50 becomes equal to or more than the threshold Tbref at time t23, the request for temperature increase in the battery 50 is ended and the one-side driving is switched to the both-side driving.

In the modification, when the temperature Tb of the battery 50 is equal to or more than the threshold Tbref and the absolute value of the target electric power Pm* of the motor 32 is equal to or more than the threshold Pmref1, the both-side driving is executed. When the temperature Tb of the battery 50 is equal to or more than the threshold Tbref and the absolute value of the target electric power Pm* of the motor 32 is less than the threshold Pmref1, the one-side driving is basically executed (on condition that the temperature Ts1 of the switch unit 53 is less than the threshold Tsref1 and the temperature TL1 of the reactor L1 is less than the threshold TLref1). Meanwhile, when the temperature Tb of the battery 50 is less than the threshold Tbref and the absolute value of the target electric power Pm* of the motor 32 is equal to or more than the threshold Pmref2 that is larger than the threshold Pmref1, the both-side driving is executed. When the temperature Tb of the battery 50 is less than the threshold Tbref and the absolute value of the target electric power Pm* of the motor 32 is less than the threshold Pmref2, the one-side driving is basically executed. Therefore, when the temperature Tb of the battery 50 is less than the threshold Tbref, the range of the absolute value of the target electric power Pm* of the motor 32 in which the one-side driving is executed is enlarged as compared with when the temperature Tb of the battery 50 is equal to or more than the threshold Tbref. As a result, it becomes possible to promote temperature increase in the battery 50. When the absolute value of the target electric power Pm* of the motor 32 is equal to or more than the threshold Pmref2, the both-side driving is still executed if the temperature Tb of the battery 50 is less than the threshold Tbref. As a consequence, it becomes possible to prevent the absolute value of the current IL1 of the reactor L1 from becoming relatively large, i.e., to prevent relatively large electric power from being transferred between the low-voltage system electric power line 62 and the high-voltage system electric power line 60 only through the first boost converter 52.

In the present modification, in both the cases where the temperature Tb of the battery 50 is equal to or more than the threshold Tbref and where the temperature Tb of the battery 50 is less than the threshold Tbref, the one-side driving or the both-side driving is executed in accordance with the absolute value of the target electric power Pm* of the motor 32. However, the one-side driving or the both-side driving may be executed in accordance with the absolute value of the target current Im* of the motor 32 in place of the absolute value of the target electric power Pm* of the motor 32. Here, a value obtained by dividing the target electric power Pm* of the motor 32 by the voltage VH of the drive voltage system electric power line 60 may be used as the target current Im* of the motor 32. In this case, when the temperature Tb of the battery 50 is equal to or more than the threshold Tbref and the absolute value of the target current Im* of the motor 32 is equal to or more than the threshold Imref, the both-side driving may be executed. When the temperature Tb of the battery 50 is equal to or more than the threshold Tbref and the absolute value of the target current Im* of the motor 32 is less than the threshold Imref1, the one-side driving may be executed on condition that the temperature Ts1 of the switch unit 53 is less than the threshold Tsref1 and the temperature TL1 of the reactor L1 is less than the threshold TLref1. Here, a value corresponding to the value obtained by dividing the threshold Pmref1 by the voltage VH of the high-voltage system electric power line 60 or the like may be used as the threshold Imref1. When the temperature Tb of the battery 50 is less than the threshold Tbref and the absolute value of the target current Im* of the motor 32 is less than the threshold Imref2 that is larger than the threshold Imref1, the one-side driving may be executed on condition that the temperature Ts1 of the switch unit 53 is less than the threshold Tsref1 and the temperature TL1 of the reactor L1 is less than the threshold TLref1. When the temperature Tb of the battery 50 is less than the threshold Tbref and the absolute values of the target current Im* of the motor 32 is equal to or more than the threshold Imref2, the both-side driving may be executed. Here, a value corresponding to the value obtained by dividing the threshold Pmref2 by the voltage VH of the high-voltage system electric power line 60 or the like may be used as the threshold Imref2.

Figure 7:
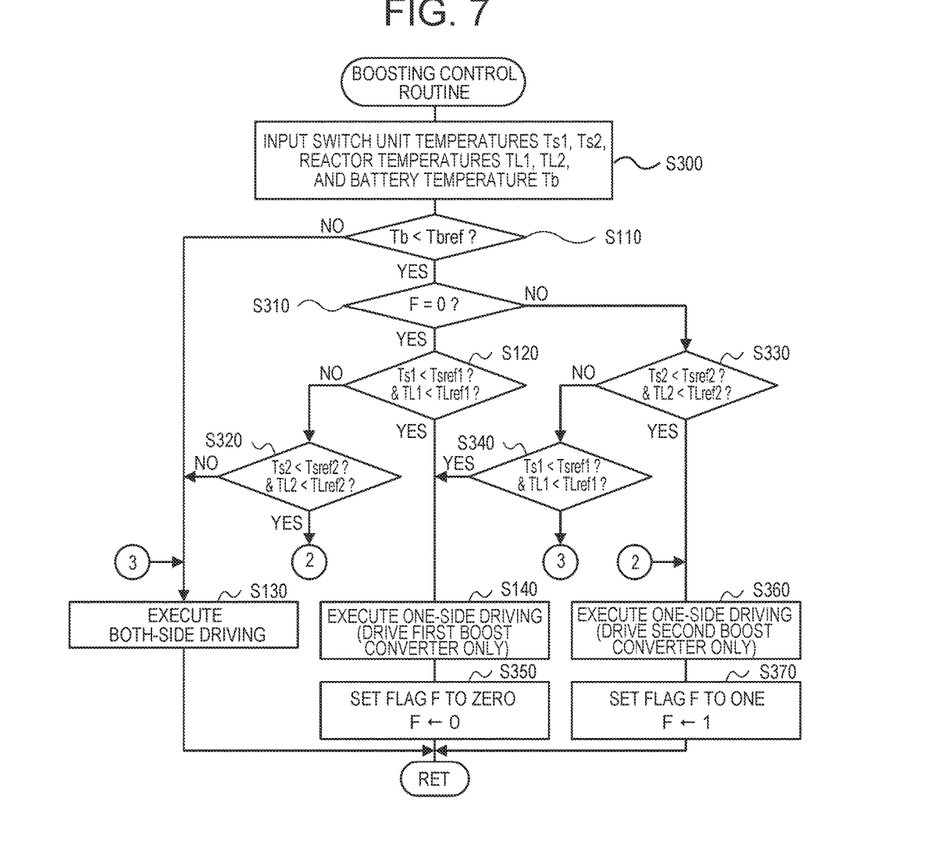
FIG. 7 is a flowchart illustrating one example of a boosting control routine.

In the power supply device 40 incorporated in the electric vehicle 20 in the embodiment, the electronic control unit 70 executes the boosting control routine of FIG. 2. However, the electronic control unit 70 may execute a boosting control routine of FIG. 7. Here, the boosting control routine of FIG. 7 is identical to the boosting control routine of FIG. 2 except for the point that the processing of step S100 is replaced with processing of step S300 and the point that processing of steps S310 to S370 is added. Therefore, like processing is designated by like step number, and a detailed description thereof is omitted.

When the boosting control routine of FIG. 7 is executed, the electronic control unit 70 first inputs the temperature Ts1 of the switch unit 53, the temperature TL1 of the reactor L1, and the temperature Tb of the battery 50 as in the processing of step S100 in the boosting control routine of FIG. 2. In addition, the electronic control unit 70 inputs the temperature Ts2 of the switch unit 57 and the temperature TL2 of the reactor L2 (step S300). Here, the temperature Ts2 of the switch unit 57 to be input is a value detected by the temperature sensor 57a. The temperature TL2 of the reactor L2 to be input is a value detected by the temperature sensor 58.

Once the data is input, the input temperature Tb of the battery 50 is compared with the threshold Tbref (step S110). When the temperature Tb of the input battery 50 is equal to or more than the threshold Tbref, it is determined that temperature increase in the battery 50 is not requested. Accordingly, the both-side driving is executed (step S130), and the present routine is ended.

When the temperature Tb of the battery 50 is less than the threshold Tbref in step S110, it is determined that the temperature increase in the battery 50 is requested, and a flag F value is checked (step S310). Here, the flag F is set to a value zero as an initial value at system startup, and then the flag F is set in the processing of step S350 or step S370 described later.

When the flag F value is zero in step S310, the temperature Ts1 of the switch unit 53 is compared with the threshold Tsref1, and the temperature TL1 of the reactor L1 is compared with the threshold TLref1 (step S120). Then, when the temperature Ts1 of the switch unit 53 is less than the threshold Tsref1 and the temperature TL1 of the reactor L1 is less than the threshold TLref1, only the first boost converter 52 is driven to execute the one-side driving (step S140), the flag F value is set to zero (step S350), and the present routine is ended.

When the temperature Ts1 of the switch unit 53 is equal to or more than the threshold Tsref1 or the temperature TL1 of the reactor L1 is equal to or more than the threshold TLref1 in step S120, the temperature Ts2 of the switch unit 57 is compared with the threshold Tsref2, and the temperature TL2 of the reactor L2 is compared with the threshold TLref2 (step S320). Here, the threshold Tsref2 is a threshold used to determine whether or not the temperature Ts2 of the switch unit 53 is relatively high. For example, temperatures such as 100° C., 110° C., and 120° C. may be used based on parameters such as rated values of the transistors T21, T22 and the diodes D21, D22 of the switch unit 57. The threshold TLref2 is a threshold used to determine whether or not the temperature TL2 of the reactor L2 is relatively high. For example, temperatures such as 140° C., 150° C., and 160° C. may be used based on parameters such as the rated value of the reactor L2.

When the temperature Ts2 of the switch unit 57 is less than the threshold Tsref2 and the temperature TL2 of the reactor L2 is less than the threshold TLref2 in step S320, only the second boost converter 56 is driven to execute the one-side driving (step S360), the flag F value is set to one (step S370), and the present routine is ended. Accordingly, it becomes possible to continue the one-side driving while suppressing excessive temperature increase in each element of the first boost converter 52. Therefore, promotion of the temperature increase in the battery 50 can be continued.

When the temperature Ts2 of the switch unit 57 is equal to or more than the threshold Tsref2 or when the temperature TL2 of the reactor L2 is equal to or more than the threshold TLref2 in step S320, the both-side driving is executed (step S130) and the present routine is ended. Accordingly, it becomes possible to suppress excessive temperature increase in each element of the first and second boost converters 52, 56 as compared with the case of driving only the first boost converter 52 or the case of driving only the second boost converter 56 as the one-side driving.

When the flag F value is one in step S310, the temperature Ts2 of the switch unit 57 is compared with the threshold Tsref2, and the temperature TL2 of the reactor L2 is compared with the threshold TLref2 (step S330). Then, when the temperature Ts2 of the switch unit 57 is less than the threshold Tsref2 and the temperature TL2 of the reactor L2 is less than the threshold TLref2, only the second boost converter 56 is driven to execute the one-side driving (step S360), the flag F value is set to one (step S370), and the present routine is ended.

When the temperature Ts2 of the switch unit 57 is equal to or more than the threshold Tsref2 or the temperature TL2 of the reactor L2 is equal to or more than the threshold TLref2 in step S330, the temperature Ts1 of the switch unit 53 is compared with the threshold Tsref1, and the temperature TL1 of the reactor L1 is compared with the threshold TLref1 (step S340).

When the temperature Ts1 of the switch unit 53 is less than the threshold Tsref1 and the temperature TL1 of the reactor L1 is less than the threshold TLref1 in step S340, only the first boost converter 52 is driven to execute the one-side driving (step S140), the flag F value is set to zero (step S350), and the present routine is ended. Accordingly, it becomes possible to continue the one-side driving while suppressing excessive temperature increase in each element of the second boost converter 56. Therefore, promotion of the temperature increase in the battery 50 can be continued.

When the temperature Ts1 of the switch unit 53 is equal to or more than the threshold Tsref1 or when the temperature TL1 of the reactor L1 is equal to or more than the threshold TLref1 in step S340, the both-side driving is executed (step S130) and the present routine is ended. Accordingly, it becomes possible to suppress excessive temperature increase in each element of the first and second boost converters 52, 56 as compared with the case of driving only the second boost converter 56 or the case of driving only the first boost converter 52 as the one-side driving.

Figure 8:
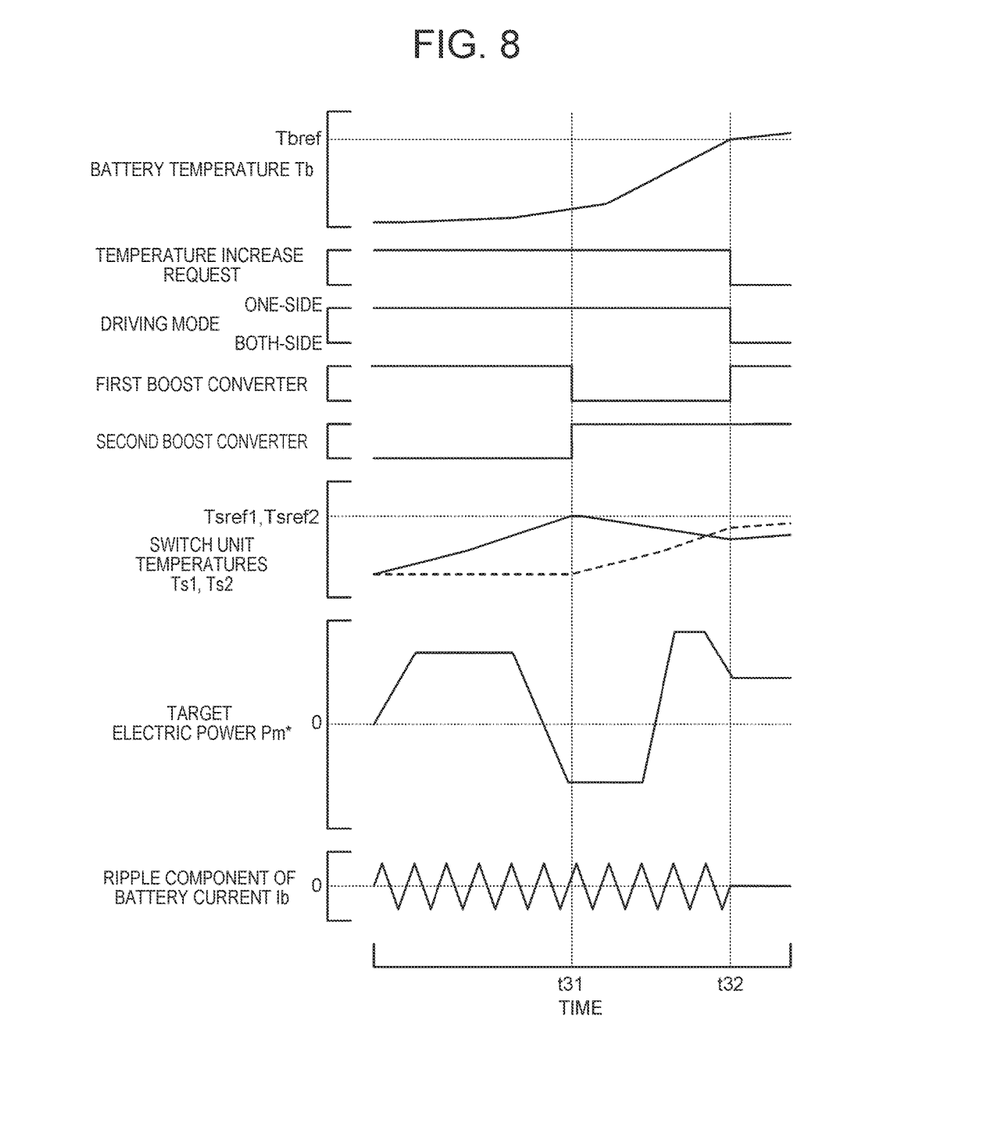
FIG. 8 is an explanatory view illustrating one example of temporal change in the temperature Tb and the temperature increase request of the battery 50, the driving mode (one-side driving, both-side driving) and the presence of driving of the first and second boost converters 52, 56, temperatures Ts1, Ts2 of switch units 53, 57 in the first and second boost converters 52, 56, the target electric power Pm* of the motor 32, and the ripple component of the current Ib of the battery 50.

FIG. 8 is an explanatory view illustrating one example of temporal change in the temperature Tb and the temperature increase request of the battery 50, the driving mode (one-side driving, both-side driving) and the presence of driving of the first and second boost converters 52, 56, the temperatures Ts1, Ts2 of switch units 53, 57 of the first and second boost converters 52, 56, the target electric power Pm* of the motor 32, and the ripple component of the current Ib of the battery 50 in the modification. In FIG. 8, the state before time t31 is the same as the state in FIG. 4. When the temperature Ts1 of the switch unit 53 becomes equal to or more than the threshold Tsref1 at time t31, driving of only the first boost converter 52 is switched to driving of only the second boost converter 56 to execute the one-side driving. Accordingly, it becomes possible to continue the one-side driving while suppressing excessive temperature increase in each element of the first boost converter 52. As a result, promotion of the temperature increase in the battery 50 can be continued. Then, when the temperature Tb of the battery 50 becomes equal to or more than the threshold Tbref at time t32, the request for temperature increase in the battery 50 is ended and the one-side driving is switched to the both-side driving.

In the modification, when the temperature Tb of the battery 50 is less than the threshold Tbref, only the first boost converter 52 is driven first, and then when the temperature Ts1 of the switch unit 53 becomes equal to or more than the threshold Tsref1 or the temperature TL1 of the reactor L1 becomes equal to or more than the threshold TLref1, only the second boost converter 56 is driven. Accordingly, it becomes possible to continue the one-side driving while suppressing excessive temperature increase in each element of the first boost converter 52. As a result, the one-side driving can be continued over a longer time, so that promotion of temperature increase in the battery 50 can be continued over a longer time.

In the power supply device 40 incorporated in the electric vehicle 20 in the embodiment, the electronic control unit 70 executes the boosting control routine of FIG. 2. However, the electronic control unit 70 may execute a boosting control routine of FIG. 9.

Figure 9:
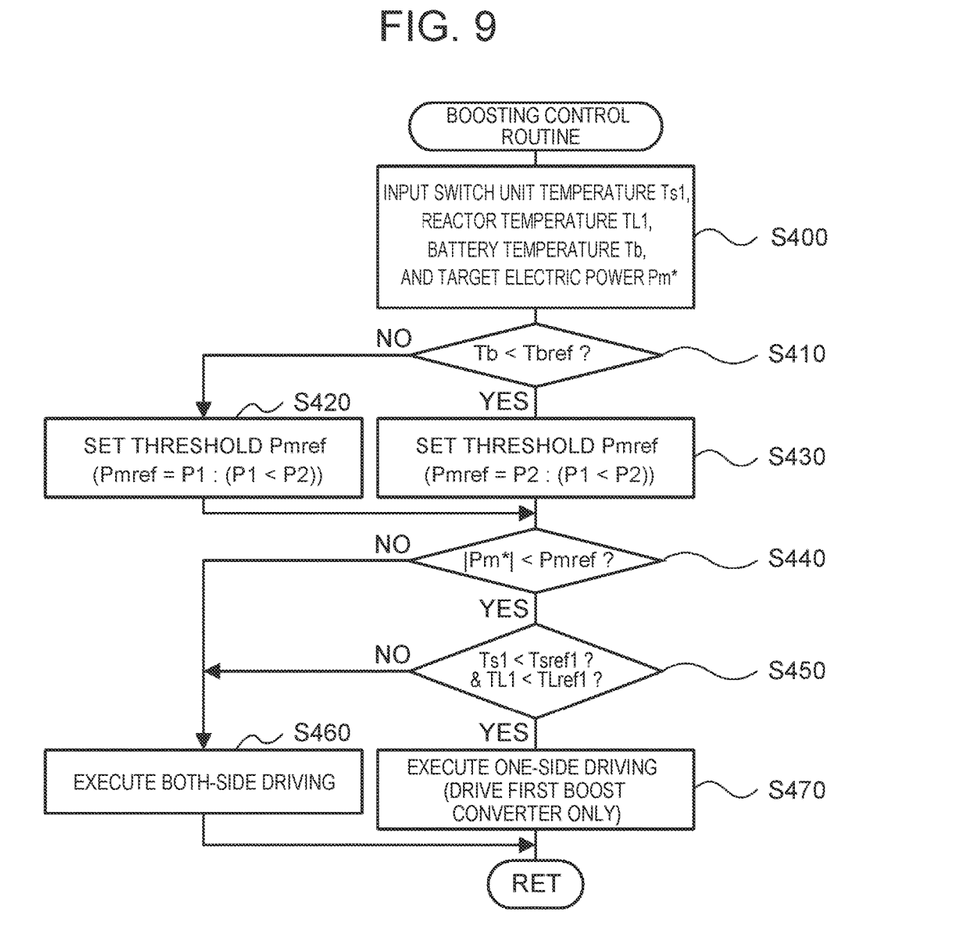
FIG. 9 is a flowchart illustrating one example of a boosting control routine.

When the boosting control routine of FIG. 9 is executed, the electronic control unit 70 first inputs the temperature Ts1 of the switch unit 53, the temperature TL1 of the reactor L1, and the temperature Tb of the battery 50 as in the processing of step S100 in the boosting control routine of FIG. 2. In addition, the electronic control unit 70 inputs the target electric power Pm* of the motor 32 (step S400). Here, the target electric power Pm* of the motor 32 to be input is a value calculated as a product of the torque command Tm* and the number of rotations Nm of the motor 32.

Once the data is input in this way, the input temperature Tb of the battery 50 is compared with the threshold Tbref (step S410). When the temperature Tb of the battery 50 is equal to or more than the threshold Tbref, it is determined that temperature increase in the battery 50 is not requested, so that the threshold Pmref is set to a predetermined value P1 (step S420). Meanwhile, when the temperature Tb of the battery 50 is less than the threshold Tbref, it is determined that temperature increase in the battery 50 is requested, so that the threshold Pmref is set to a predetermined value P2 that is larger than the predetermined value P1 (step S430). Here, a value corresponding to the threshold Pmref1 can be used as the predetermined value P1, for example. A value corresponding to the threshold Pmref2 can be used as the predetermined value P2, for example.

Next, the absolute value of the target electric power Pm* of the motor 32 is compared with the threshold Pmref (step S440). Then, when the absolute value of the target electric power Pm* of the motor 32 is equal to or more than the threshold Pmref, the both-side driving is executed (step S460) and the present routine is ended.

When the absolute value of the target electric power Pm* of the motor 32 is less than the threshold Pmref in step S440, the temperature Ts1 of the switch unit 53 is compared with the threshold Tsref1, and the temperature TL1 of the reactor L1 is compared with the threshold TLref1 (step S450). Then, when the temperature Ts1 of the switch unit 53 is less than the threshold Tsref1 and the temperature TL1 of the reactor L1 is less than the threshold TLref1, the one-side driving is executed (step S470) and the present routine is ended. On the contrary, when the temperature Ts1 of the switch unit 53 is equal to or more than the threshold Tsref1 or when the temperature TL1 of the reactor L1 is equal to or more than the threshold TLref1, the both-side driving is executed (step S460) and the present routine is ended. At the time of executing the one-side driving, only the first boost converter 52 is driven as in the embodiment.

In the modification, when the temperature Tb of the battery 50 is less than the threshold Tbref, the threshold Pmref is made larger i.e., the range of the absolute value of the target electric power Pm* of the motor 32 in which the one-side driving is executed is enlarged, as compared with when the temperature Tb of the battery 50 is equal to or more than the threshold Tbref. Accordingly, the temperature increase in the battery 50 can be promoted. As a result, it becomes possible to prevent the time taken for temperature increase in the battery 50 (time until the temperature Tb of the battery 50 becomes the threshold Tbref or more) from becoming relatively long.

In the modification, when the absolute value of the target electric power Pm* of the motor 32 is less than the threshold Pmref, the temperature Ts1 of the switch unit 53 is less than the threshold Tsref1, and the temperature TL1 of the reactor L1 is less than the threshold TLref1, the one-side driving is executed. When the absolute value of the target electric power Pm* of the motor 32 is less than the threshold Pmref, and the temperature Ts1 of the switch unit 53 is equal to or more than the threshold Tsref1 or the temperature TL1 of the reactor L1 is equal to or more than the threshold TLref1, the both-side driving is executed. However, when the absolute value of the target electric power Pm* of the motor 32 is less than the threshold Pmref, the one-side driving may be executed irrespective of the temperature Ts1 of the switch unit 53 or the temperature TL1 of the reactor L1.

In the power supply device 40 included in the electric vehicle 20 in the embodiment, the temperature Ts1 of the switch unit 53 and the temperature TL1 of the reactor L1 are used as the temperature of the first boost converter 52. However, any one of the temperature Ts1 of the switch unit 53 and the temperature TL1 of the reactor L1 may be used as the temperature of the first boost converter 52. A temperature from a temperature sensor that detects the overall temperature of the first boost converter 52 may also be used. Similarly, in the modification, the temperature Ts2 of the switch unit 57 and the temperature TL2 of the reactor L2 are used as the temperature of the second boost converter 56. However, any one of the temperature Ts2 of the switch unit 57 and the temperature TL2 of the reactor L2 may be used as the temperature of the second boost converter 56. A temperature from a temperature sensor that detects the overall temperature of the second boost converter 56 may also be used.

In the embodiment, the power supply device 40 is configured to be incorporated in the electric vehicle 20 that travels only with motive power from the motor 32. However, the power supply device may be configured to be incorporated in a hybrid vehicle that travels using the motive power from the motor and the motive power from an engine.

Correspondence relation between the main elements of the embodiment and the main elements of the present disclosure described in Summary will be described. In the embodiment, the battery 50 corresponds to "the battery", the first and second boost converters 52, 56 correspond to "the first and second boost converters", the electronic control unit 70 corresponds to "the electronic control unit", and the motor 32 corresponds to "the load" and "the motor".

Since the correspondence relation between the main elements of the embodiment and the main elements of the present disclosure described in Summary is one example for specific description of the mode for carrying out the present disclosure described in Summary, the correspondence relation is not intended to limit the elements of the present disclosure described in Summary. More specifically, the present disclosure disclosed in Summary should be interpreted based on the description therein, and the embodiment is merely a specific example of the present disclosure disclosed in Summary.

Although the mode for carrying out the present disclosure has been described using the embodiment, the present disclosure is not limited in any manner to the embodiment disclosed. It should naturally be understood that the present disclosure can be carried out in various modes without departing from the scope of the present disclosure.

The present disclosure is applicable in the fields such as manufacturing of the power supply device.

What is claimed is:

1. A power supply device, comprising:
    a first electric power line connected to a load;
    a second electric power line connected to a battery;
    a first boost converter including a first switching element, a first diode, and a first reactor, the first boost converter being connected to the first electric power line and the second electric power line, the first boost converter being configured to transfer electric power between the second electric power line and the first electric power line while changing a voltage of the electric power;
    a second boost converter including a second switching element, a second diode, and a second reactor, the second boost converter being connected to the first electric power line and the second electric power line, the second boost converter being configured to transfer electric power between the second electric power line and the first electric power line while changing the voltage of the electric power; and
    an electronic control unit configured to execute both-side driving when a temperature of the battery is equal to or more than a specified temperature and to execute one-side driving when the temperature of the battery is less than the specified temperature, the electronic control unit being configured to drive the first switching element of the first boost converter and the second switching element of the second boost converter with driving signals different in phase to execute the both-side driving, the electronic control unit being configured to drive one of the first boost converter and second boost converter to execute the one-side driving.

2. The power supply device according to claim 1, wherein the electronic control unit is configured to execute the both-side driving when the temperature of the battery is less than the specified temperature and an absolute value of a target output of the load is equal to or more than a predetermined output.

3. The power supply device according to claim 2, wherein the electronic control unit is configured to execute the one-side driving when the temperature of the battery is equal to or more than the specified temperature and the absolute value of the target output of the load is less than a second predetermined output that is smaller than the predetermined output.

4. The power supply device according to claim 1, wherein the electronic control unit is configured to, to execute the one-side driving, drive only the first boost converter at first, and then drive only the second boost converter after the temperature of the first boost converter becomes a second specified temperature or more.

5. The power supply device according to claim 1, wherein the load is a motor.

6. A power supply device, comprising:
    a first electric power line connected to a load;
    a second electric power line connected to a battery;
    a first boost converter including a first switching element, a diode, and a reactor, the first boost converter being connected to the first electric power line and the second electric power line, the first boost converter being configured to transfer electric power between the second electric power line and the first electric power line while changing a voltage of the electric power;
    a second boost converter including a second switching element, the second boost converter being connected to the first electric power line and the second electric power line, the second boost converter being configured to transfer electric power between the second electric power line and the first electric power line while changing the voltage of the electric power; and
    an electronic control unit configured to execute both-side driving when an absolute value of a target output of the load is equal to or more than a threshold and to execute one-side driving when the absolute value of the target output of the load is less than the threshold, the electronic control unit being configured to drive the first switching element of the first boost converter and the second switching element of the second boost converter with driving signals different in phase to execute the both-side driving, and the electronic control unit being configured to drive one of the first boost converter and second boost converter to execute the one-side driving, wherein the threshold at a first time when a temperature of the battery is less than a specified temperature is larger than the threshold at a second time when the temperature of the battery is equal to or more than the specified temperature.

7. The power supply device according to claim 6, wherein the load is a motor.

UNITED STATES PATENT AND TRADEMARK OFFICE
CERTIFICATE OF CORRECTION

PATENT NO. : 10,040,356 B2
APPLICATION NO. : 15/427577
DATED : August 7, 2018
INVENTOR(S) : Yuki Jojima

Page 1 of 1

It is certified that error appears in the above-identified patent and that said Letters Patent is hereby corrected as shown below:

In the Specification

In Column 7, Line 9, delete "Tin*" and insert --Tm*--, therefor.

Signed and Sealed this
Second Day of October, 2018

Andrei Iancu
*Director of the United States Patent and Trademark Office*